US012780110B2

(12) United States Patent
Huang et al.

(10) Patent No.: US 12,780,110 B2
(45) Date of Patent: Nov. 3, 2026

(54) ELECTRONIC DEVICE

(71) Applicant: CARUX TECHNOLOGY PTE. LTD., Singapore (SG)

(72) Inventors: Ta-Chin Huang, Tainan (TW); Ching-I Lo, Tainan (TW); Hung-Ching Lee, Tainan (TW); Hung-Wen Lin, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 181 days.

(21) Appl. No.: 18/432,016

(22) Filed: Feb. 4, 2024

(65) Prior Publication Data

US 2024/0294123 A1 Sep. 5, 2024

Related U.S. Application Data

(60) Provisional application No. 63/449,050, filed on Mar. 1, 2023.

(30) Foreign Application Priority Data

Dec. 1, 2023 (CN) ........................ 202311637261.X

(51) Int. Cl.

*B60R 11/02* (2006.01)
*B60R 11/00* (2006.01)
*B60R 16/03* (2006.01)
*B60R 21/20* (2011.01)

(52) U.S. Cl.

CPC ... *B60R 11/0235* (2013.01); *B60R 2011/0092* (2013.01); *B60R 2011/0276* (2013.01); *B60R 16/03* (2013.01); *B60R 21/20* (2013.01)

(58) Field of Classification Search

None

See application file for complete search history.

(56) References Cited

U.S. PATENT DOCUMENTS

| | | | | |
|---|---|---|---|---|
| 7,800,320 B2 * | 9/2010 | Kawasoe | F16H 57/12 | 318/68 |
| 2008/0010875 A1 * | 1/2008 | Kuwabara | B60K 35/22 | 40/424 |
| 2008/0068848 A1 * | 3/2008 | Kim | H04N 5/64 | 348/E5.143 |

(Continued)

FOREIGN PATENT DOCUMENTS

| | | |
|---|---|---|
| CN | 2472282 | 1/2002 |
| CN | 210687698 | 6/2020 |

(Continued)

OTHER PUBLICATIONS

Translation of CN 214412417 (Year: 2021).*
Translation of DE-102014016323 (Year: 2021).*

*Primary Examiner* — Peter D Nolan
*Assistant Examiner* — Michael F Whalen
(74) *Attorney, Agent, or Firm* — JCIPRNET

(57) ABSTRACT

An electronic device is disposed on a vehicle body. The electronic device includes a display, a modulation unit and a control unit. The display is connected to the vehicle body through the modulation unit. The control unit is electrically connected to the modulation unit. The control unit controls the modulation unit to regulate a fixed state of the display.

19 Claims, 8 Drawing Sheets

P1

(56) References Cited

U.S. PATENT DOCUMENTS

| | | | | |
|---|---|---|---|---|
| 2009/0008974 | A1* | 1/2009 | Hattori | B60R 11/0235<br>297/217.3 |
| 2015/0138044 | A1* | 5/2015 | Rawlinson | H04N 21/42201<br>345/2.2 |
| 2019/0193644 | A1* | 6/2019 | Amano | B60R 11/0235 |
| 2022/0317767 | A1* | 10/2022 | Zhang | B60K 35/22 |
| 2024/0190373 | A1* | 6/2024 | Fontana | B60R 21/02 |

FOREIGN PATENT DOCUMENTS

| | | | | | |
|---|---|---|---|---|---|
| CN | 214412417 | U | * | 10/2021 | |
| DE | 102014016323 | B4 | * | 11/2021 | B60K 35/654 |
| JP | 6035184 | | | 11/2016 | |

* cited by examiner

ELECTRONIC DEVICE

CROSS-REFERENCE TO RELATED APPLICATION

This application claims the priority benefit of U.S. provisional application Ser. No. 63/449,050, filed on Mar. 1, 2023, and China application serial no. 202311637261.X, filed on Dec. 1, 2023. The entirety of each of the above-mentioned patent applications is hereby incorporated by reference herein and made a part of this specification.

BACKGROUND

Technical Field

The disclosure relates to an electronic device, in particular to an electronic device that is capable of quickly regulating a fixed state of a display.

Description of Related Art

Currently, the positions of vehicle displays are fixed and cannot be adjusted or quickly removed, resulting in limitation in use and less convenience.

SUMMARY

The disclosure is directed to an electronic device that is capable of quickly regulating a fixed state of a display.

According to embodiments of the disclosure, an electronic device is disposed on a vehicle body. The electronic device includes a display, a modulation unit and a control unit. The display is connected to the vehicle body through the modulation unit. The control unit is electrically connected to the modulation unit. The control unit controls the modulation unit to regulate the fixed state of the display.

Based on the above, in the embodiments of the disclosure, the display is connected to the vehicle body through the modulation unit, and the control unit controls the modulation unit to regulate the fixed state of the display. Through the design, the fixed state of the display may be quickly regulated, so that the display has more operational freedom, and the electronic device of the disclosure may have better flexibility of use.

In order to make the above-mentioned features and advantages of the disclosure comprehensible, embodiments accompanied with drawings are described in detail as follows.

DESCRIPTION OF THE EMBODIMENTS

Figure 1A:
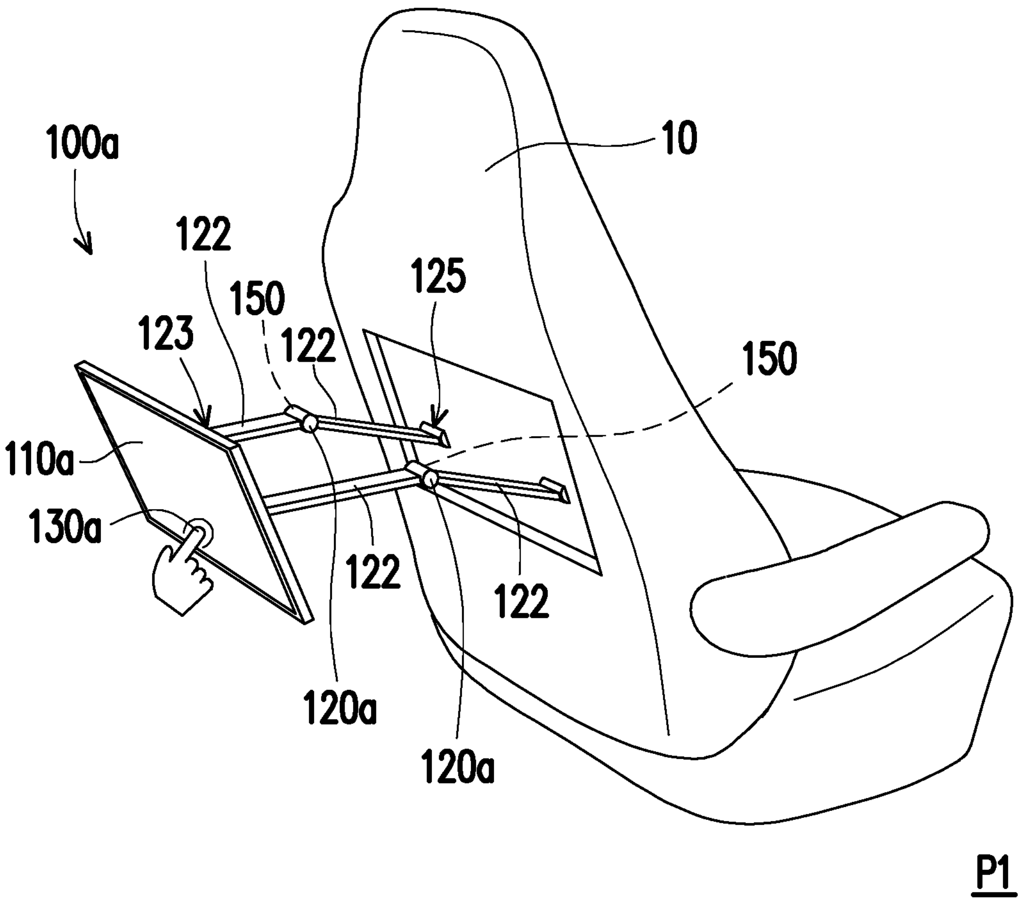
FIG. 1A is a schematic perspective view of an electronic device in a first fixed position according to an embodiment of the disclosure.

The disclosure may be understood by referring to the following detailed description in conjunction with the accompanying drawings. It should be noted that, in order to facilitate understanding and for the concision of the drawings, merely a part of the electronic device is shown in the drawings in the disclosure, and the specific elements in the drawings are not drawn according to the actual scale. In addition, the number and size of each element in the drawings are merely for illustration, and are not intended to limit the scope of the disclosure.

Throughout the description of the disclosure and the appended claims, certain terms may be used to refer to specific elements. People skilled in the art should understand that electronic equipment manufacturers may refer to the same elements by different names. The disclosure does not intend to distinguish between elements that have the same function but have different names.

In the following description and claims, the words "comprising" and "including" are open-ended words, and thus should be interpreted as meaning "including but not limited to . . . ."

In addition, relative terms, such as "below" or "bottom" and "above" or "top", may be used in the embodiments to describe the relative relationship of one element of the drawing to another element. It will be understood that if the device in the figures is turned upside down, elements described as being on the "below" side would then be elements described as being on the "above" side.

In some embodiments of the disclosure, terms related to bonding and connection, such as "connection", "interconnection", etc., unless otherwise specified, may mean that two structures are in direct contact, or may also mean that two structures are not in direct (indirect) contact, and there are other structures disposed between these two structures. And the terms about bonding and connection may also include the situation that both structures are movable, or both structures are fixed. In addition, the term "coupling" includes the transfer of energy between two structures through direct or indirect electrical connection, or the transfer of energy between two separate structures through mutual induction.

It should be understood that when an element or a film layer is referred to as being "on" or "connected to" another element or film layer, the element or film layer may be directly on or directly connected to this other element or film layer, or there is an intervening element or film layer in between (an indirect case). In contrast, when an element is referred to as being "directly on" or "directly connected to" another element or film layer, there are no intervening elements or film layers in between.

The terms "about", "equal to", "equivalent" or "the same", "essentially" or "substantially" are generally interpreted as within 20% of a given value or range, or as within 10%, 5%, 3%, 2%, 1%, or 0.5% of the given value or range.

As used herein, the terms "film" and/or "layer" may refer to any continuous or discontinuous structure and material (such as materials deposited by the methods disclosed herein). For example, films and/or layers may include two-dimensional materials, three-dimensional materials, nanoparticles, or even partial or complete molecular layers, or partial or complete atomic layers, or clusters of atoms and/or molecules. The film or layer may include a material or layer having pinholes, which may be at least partially continuous.

Although the terms "first", "second", "third" and the like may be used to describe various constituent elements, the constituent elements are not limited to the terms. The terms are merely used to distinguish a single constituent element from other constituent elements in the specification. The same terms may not be used in the claims, and may be replaced with first, second, third and the like in the order in which the elements are declared in the claims. Therefore, in the following description, the first constituent element may be the second constituent element in the claims.

Unless otherwise defined, all terms (including technical and scientific terms) used herein have the same meaning as commonly understood by one of ordinary skill in the art to which the disclosure belongs. It is understood that these terms, such as those defined in commonly used dictionaries, should be interpreted as having meanings consistent with the relevant art and the background or context of the disclosure, and should not be interpreted in an idealized or overly formal manner unless otherwise defined herein.

It should be noted that, in the following embodiments, the technical features of several different embodiments may be replaced, recombined, and mixed to complete other embodiments without departing from the spirit of the disclosure.

The electronic device of the disclosure may include a display device, an antenna device, a sensing device, a light emitting device, or a splicing device, but is not limited thereto. The electronic device may include a bendable or flexible electronic device. The electronic device may include electronic elements. Electronic elements may include passive elements, active elements, or a combination thereof, such as capacitors, resistors, inductors, variable capacitors, filters, diodes, transistors, sensors, micro-electromechanical systems (MEMS), and liquid crystal chips, etc., but are not limited thereto. Diodes may include light emitting diodes or non-light emitting diodes. Diodes include P-N Junction diodes, PIN diodes or constant current diodes. Light emitting diodes may include, for example, organic light emitting diodes (OLEDs), sub-millimeter light emitting diodes (mini LEDs), micro light emitting diodes (micro LEDs), quantum dot light emitting diodes (quantum dot LEDs), fluorescence, phosphor or other suitable materials, or a combination of thereof, but not limited thereto this. Sensors may include, for example, capacitive sensors, optical sensors, electromagnetic sensors, fingerprint sensors (FPS), touch sensors, antennas, or pen sensors, etc., but are not limited thereto. Hereinafter, a display device will be used as an electronic device to illustrate the disclosure, but the disclosure is not limited thereto.

Reference is now made in detail to exemplary embodiments of the disclosure, and examples of the exemplary embodiments are illustrated in the accompanying drawings. Wherever possible, the same reference numerals are used in the drawings and descriptions to refer to the same or similar parts.

Figure 1B:
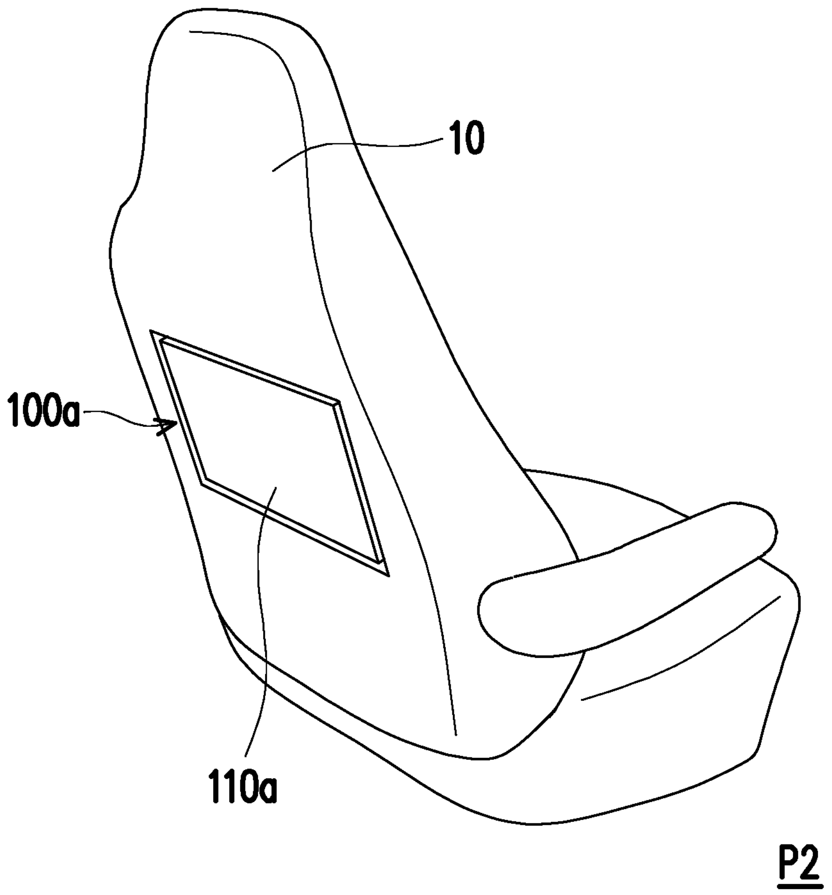
FIG. 1B is a perspective view of the electronic device of FIG. 1A in a second fixed position.
Figure 1C:
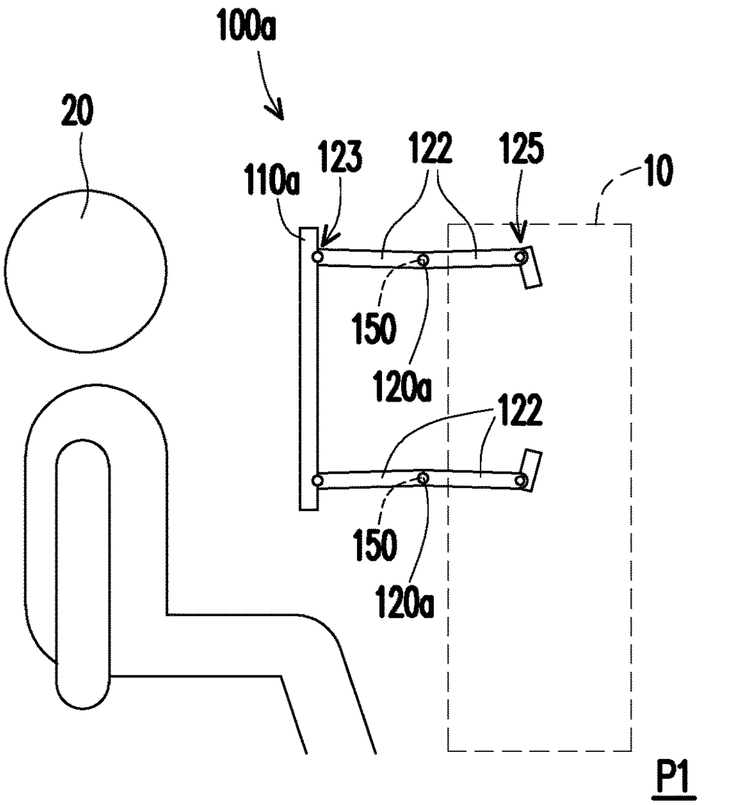
FIG. 1C is a schematic diagram of the relative position of a user and the electronic device of FIG. 1A.
Figure 1D:
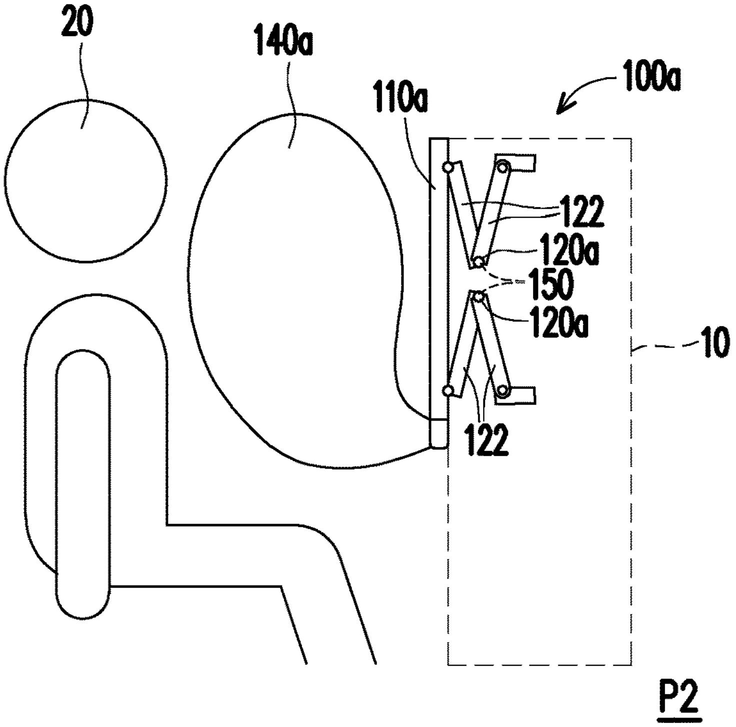
FIG. 1D is a schematic diagram of the relative position of the user and the electronic device of FIG. 1B.
Figure 2A:
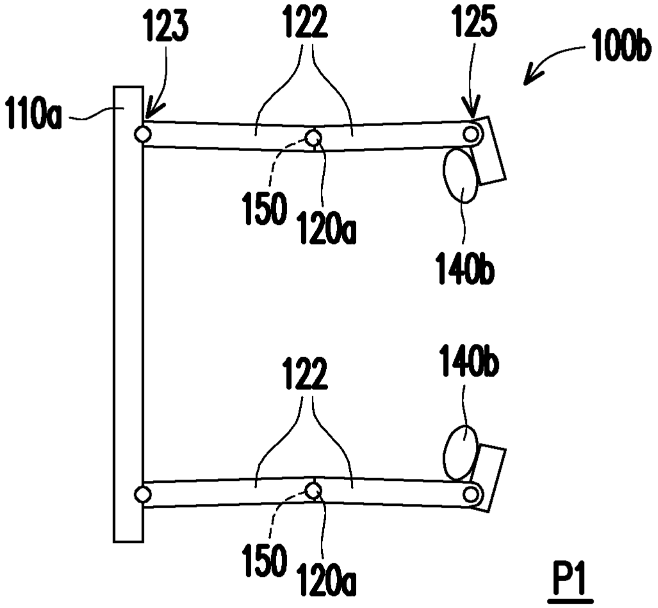
FIG. 2A is a schematic diagram of an electronic device in a first fixed position according to an embodiment of the disclosure.
Figure 2B:
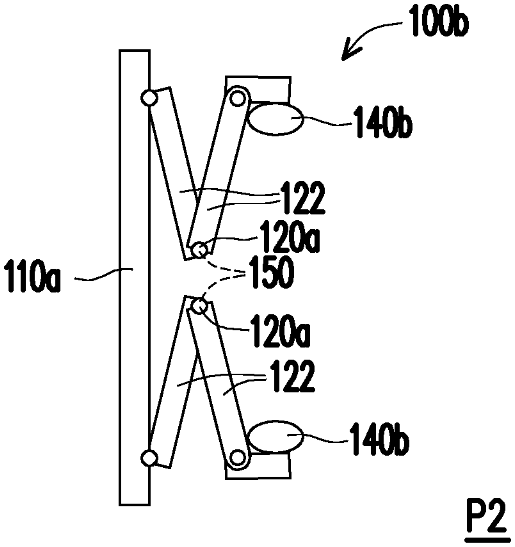
FIG. 2B is a schematic diagram of the electronic device of FIG. 2A in a second fixed position.

FIG. 1A is a schematic perspective view of an electronic device in a first fixed position according to an embodiment of the disclosure. FIG. 1B is a perspective view of the electronic device of FIG. 1A in a second fixed position. FIG. 1C is a schematic diagram of the relative position of a user and the electronic device of FIG. 1A. FIG. 1D is a schematic diagram of the relative position of the user and the electronic device of FIG. 1B. FIG. 2A is a schematic diagram of an electronic device in a first fixed position according to an embodiment of the disclosure. FIG. 2B is a schematic diagram of the electronic device of FIG. 2A in a second fixed position.

Referring to FIGS. 1A and 1B at the same time, in the embodiment, an electronic device 100*a* is disposed on a vehicle body 10. The electronic device 100*a* includes a display 110*a*, a modulation unit 120*a* and a control unit 130*a*. The display 110*a* is connected to the vehicle body 10 through the modulation unit 120*a*. The control unit 130*a* is electrically connected to the modulation unit 120*a*. The control unit 130*a* controls the modulation unit 120*a* to regulate the fixed state of the display 110*a*.

In an embodiment, the vehicle body 10 may be, for example, a vehicle shell body and/or an interior, and the interior may be a seat, but is not limited thereto. In an embodiment, the electronic device 100*a* may be, for example, a car screen. The display 110*a* may be a non-self-luminous display, such as a liquid crystal display (LCD), or the display 110*a* may be a self-luminous display, such as an organic light emitting diode (OLED) display, a micro light emitting diode (Micro-LED) display, a mini light emitting diode (Mini-LED) display or a quantum dot LED display, but is not limited thereto.

In the embodiment, the modulation unit 120*a* may be, for example, a servo motor or other motors that may sense force and change the position of the display 110*a*. The modulation unit 120*a* of the embodiment may include at least one connecting rod 122 (two connecting rods 122 are schematically shown), one end 123 of the connecting rod 122 is connected to the display 110*a*, and the other end 125 of the connecting rod 122 is connected to the vehicle body 10. Therefore, the display 110*a* may be reset by manually retracting the display 110*a*. In an embodiment, the connecting rod 122 may be a single rod, a double connecting rod, a single-axis or a multi-axis connecting rod, and the modulation unit 120*a* may memorize the last extension height and position of the connecting rod 122.

Furthermore, the control unit 130*a* of the embodiment may control the modulation unit 120*a* to regulate the fixed state of the display 110*a*. Here, the control unit 130*a* is, for example, a button disposed on the display 110, and the display 110*a* is automatically released or retracted by pressing the button. As shown in FIGS. 1C and 1D, the fixed state described here may include a first fixed position P1 and a second fixed position P2, and the first fixed position P1 and the second fixed position P2 are different. For example, the first fixed position P1 is the position where the display 110*a* is far away from the vehicle body 10, that is, a user 20 pulls out the display 110*a* from the vehicle body 10, and the second fixed position P2 is where the display 110*a* is retracted onto the vehicle body 10.

In order to prevent the user 20 from directly hitting the display 110*a* when an accident occurs, the electronic device 100*a* of the embodiment may further include at least one buffer member 140*a* (one buffer member 140*a* is schematically shown), which is disposed on the vehicle body 10. The buffer member 140*a* may be adjacent to the display 110*a*, but is not limited thereto. In another embodiment, referring to FIGS. 2A and 2B at the same time, the number of buffer members 140*b* of an electronic device 100*b* may be multiple, and the buffer members 140*b* may be disposed adjacent to the modulation unit 120*a*, such as being disposed on the other end 125 of the connecting rod 122 connected to the vehicle body 10. In an embodiment, the buffer member 140*a* and the buffer member 140*b* may be, for example, airbags, which may explode when the vehicle body 10 is impacted to protect the user 20 from being injured by directly hitting the display 110*a*. In an embodiment, when the buffer member 140*a* and the buffer member 140*b* are exploded, the connecting rod 122 may also be pushed to allow the display 110*a* to be retracted to the vehicle body 10.

In addition, the electronic device 100*a* of the embodiment further includes at least one sensing module 150 (two sensing modules 150 are schematically shown), which is electrically connected to the control unit 130*a* and configured to output at least one sensing signal, and the control unit 130*a* may control the modulation unit 120*a* according to the at least one sensing signal. That is, the electronic device 100*a* of the embodiment may use the sensing of the sensing module 150, when the vehicle body 10 is subjected to an emergency stop or return, the control unit 130*a* controls the modulation unit 120*a* so that the action of the connecting rod 122 may be retracted automatically due to resistance stop or thrust, so as to regulate the fixed state of the display 110*a*. In other words, through the modulation unit 120*a* and the sensing module 150, the user 20 may directly stop the running display 110*a* to regulate the position of the display 110*a*, or return the display 110*a* to the folded state. In an embodiment, the sensing module 150 may be a kit, for example, infrared ranging, memory motor rotation number, pressure sensing, force sensing, etc., and is not limited here.

It should be noted that here, the sensing module 150 and the modulation unit 120*a* are disposed at the same position, but not limited thereto. In other embodiments, the sensing module 150 and the modulation unit 120*a* may also be disposed at different positions. For example, the modulation unit 120*a* may be selectively disposed on the connecting rod 122 or the display 110*a*, or the sensing module 150 may be selectively disposed on the connecting rod 122 or the display 110*a*.

In short, the display 110*a* of the embodiment may be connected to the vehicle body 10 through the modulation unit 120*a*, and the control unit 130*a* controls the modulation unit 120*a* to regulate the fixed state of the display 110*a*. That is, the electronic device 100*a* of the embodiment may have the functions of telescopic displacement, automatic return, and position memory. Through the design, the fixed state of the display 110*a* may be quickly regulated, so that the display 110*a* has more operational freedom, and the electronic device 100*a* of the disclosure may have better flexibility of use.

It should be noted here that the following embodiments use the element numbers and part of the content of the previous embodiments, the same numbers are used to denote the same or similar elements, and descriptions of the same technical content are omitted. For the description of omitted parts, reference may be made to the foregoing embodiments, and the description will not be repeated in the following embodiments.

Figure 3A:
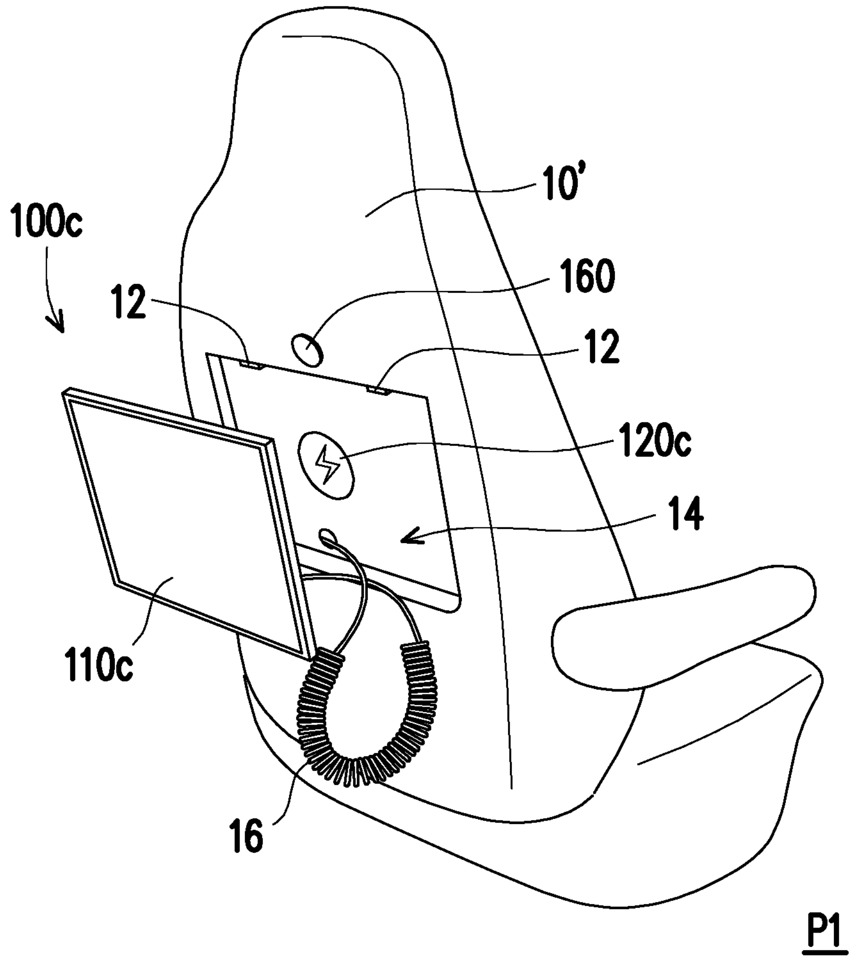
FIG. 3A is a schematic perspective view of an electronic device according to another embodiment of the disclosure.
Figure 3B:
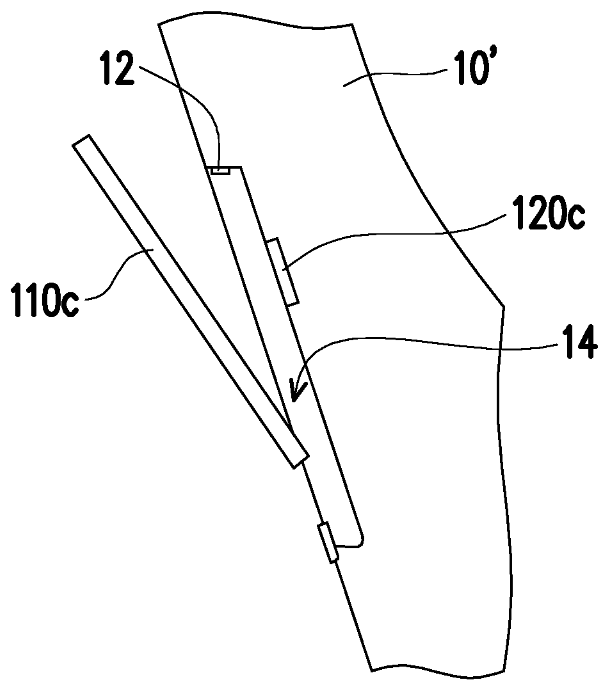
FIG. 3B is a schematic side view of the electronic device of FIG. 3A.
Figure 3C:
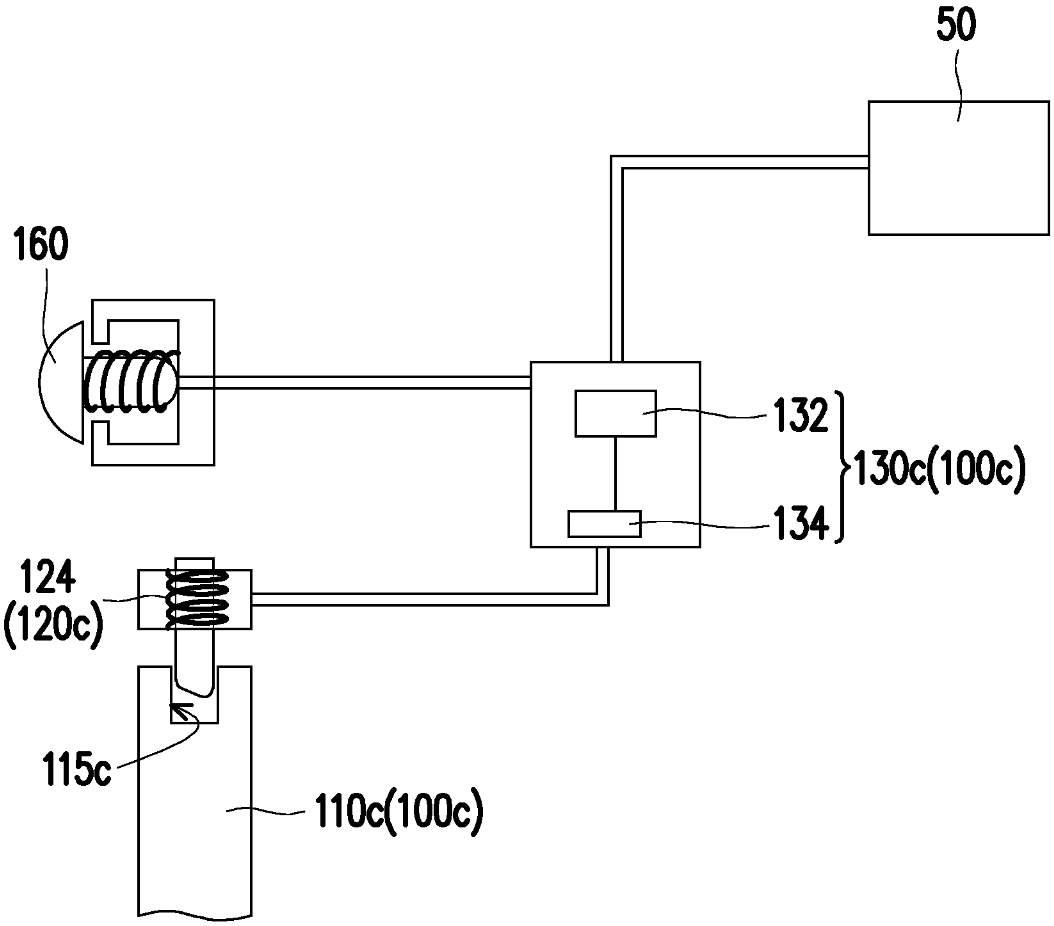
FIG. 3C is a schematic diagram of the electronic device in FIG. 3A being electronically fixed to the vehicle body.

FIG. 3A is a schematic perspective view of an electronic device according to another embodiment of the disclosure. FIG. 3B is a schematic side view of the electronic device of FIG. 3A. FIG. 3C is a schematic diagram of the electronic device in FIG. 3A being electronically fixed to the vehicle body.

Referring to FIGS. 3A, 3B and 3C at the same time, in the embodiment, an electronic device 100*c* is disposed on a vehicle body 10', and the electronic device 100*c* includes a display 110*c*, a modulation unit 120*c* and a control unit 130*c*. The display 110*c* is connected to the vehicle body 10' through the modulation unit 120*c*. The control unit 130*c* is electrically connected to the modulation unit 120*c*, and the control unit 130*c* controls the modulation unit 120*c* to regulate the fixed state of the display 110*c*.

In detail, the vehicle body 10' of the embodiment includes at least one fixed structure (a fixed structure 12 is schematically shown), and the display 110*c* may be fixed to the vehicle body 10' through the fixed structure 12. In an embodiment, the fixed structure 12 is, for example, a latch, which may engage with a slot 115*c* on the display 110*c* and fix the display 110*c* to the vehicle body 10', but is not limited thereto. The vehicle body 10' of the embodiment may further include at least one groove (a groove 14 is schematically shown), and the display 110*c* is partially accommodated in the groove 14. Furthermore, in the embodiment, the modulation unit 120*c* includes an electromagnetic structure 124, and the control unit 130*c* is configured to regulate the amount of energy output by the electromagnetic structure 124. In an embodiment, the electromagnetic structure 124 may be, for example, a combination of an electromagnet and a wireless charging element, and may have magnetic fixation and charging functions. In an embodiment, the control unit 130*c* may adjust the amount of energy output by the electromagnetic structure 124 so that the electromagnetic structure 124 generates different magnetic attraction forces or different charging efficiencies. Specifically, when the electromagnetic structure 124 generates different magnetic attraction forces, the output energy may mean that the electromagnetic structure 124 may generate different magnetic fluxes, thereby causing the electromagnetic structure 124 to generate different fixed forces. In another embodiment, when the electromagnetic structure 124 charges an electronic device, such as the display 110*c*, the output energy may mean that the electromagnetic structure 124 may generate different charging currents, so that the electromagnetic structure 124 may modulate the charging efficiency according to the situation. For example, an electronic device (such as a display) is charged with higher output energy (a larger current) when being in the low battery to speed up the charging process; and an electronic device (such as a display) is charged with lower output energy (a smaller current) when being in high battery to protect the electronic device. In addition, the electronic device 100*c* of the embodiment further includes a drive unit 160, which is electrically connected to the control unit 130*c* and configured to send a drive signal to the control unit 130*c*. In an embodiment, the drive unit 160 may be, for example, a button, and the control unit 130*c* may include a control circuit 132 and a drive circuit 134 that are electrically connected to each other. A power supply 50 may supply power and is electrically connected to the control unit 130*c*.

When the user presses the drive unit 160, the drive unit 160 sends a drive signal to the control circuit 132 of the control unit 130*c*, and the drive circuit 134 may drive the electromagnetic structure 124 according to the signal of the control circuit 132 to release the electromagnetic structure 124 so that the fixed structure 12 may withdraw from the slot 115*c* on the display 110*c*, and the display 110*c* may be pulled out of the groove 14 of the vehicle body 10' for use, such as being located at the first fixed position P1 in FIG. 3A. It should be noted that if the display 110*c* is not taken out for a period of time after the electromagnetic structure 124 is released, the control unit 130*c* controls the modulation unit 120*c* to regulate the display 110*c* to automatically return and lock the display 110*c*.

Here, the fixed state of the display 110*c* may include a first fixed strength and a second fixed strength, and the first fixed strength and the second fixed strength are different. For example, the first fixed strength may be, for example, to release the electromagnetic structure 124, that is, the magnetic attraction strength of the electromagnetic structure 124 is weakened, and the display 110*c* may be pulled out from the groove 14 of the vehicle body 10' for use. The second fixed strength may be, for example, to excite the electromagnetic structure 124, that is, the magnetic attraction strength of the electromagnetic structure 124 increases, allowing the display 110*c* to be suctioned in the groove 14 of the vehicle body 10'. By changing the magnetic attraction strength, the display 110*c* can be quickly taken and placed. The fixed strength may be tested for resistance with a universal tensile testing machine, a spring tension and compression testing machine, a tensile testing machine, etc., but is not limited thereto.

In addition, please refer to FIG. 3A again. In the embodiment, the vehicle body 10' may further include a charging coil 16, which may electrically connect the vehicle body 10' and the display 110*c*. The display 110*c* may be charged through a wired method (i.e., the charging coil 16), but is not limited thereto. In another embodiment, the display 110*c* may also be charged through Qi wireless charging or contact charging, which still falls within the scope of the disclosure.

In short, the electronic device 100*c* of the embodiment regulates the storage state of the display 110*c* through electronic control and a safe magnetic and locking design (i.e., the electromagnetic structure 124 and the fixed structure 12), so that the display 110*c* does not fall off due to vibration or impact when not in use, which may take into account the safety of the product and the user, and may have the display 110*c* be quickly taken and placed. Furthermore, the electromagnetic structure 124 may hold the display 110*c* with suctioning when being released so that the display 110*c* is not easy to fall off, and is taken out with a certain amount of force required. In addition, the display 110*c* may be fixed through the disposition of the fixed structure 12 and the groove 14 of the vehicle body 10'.

Figure 4:
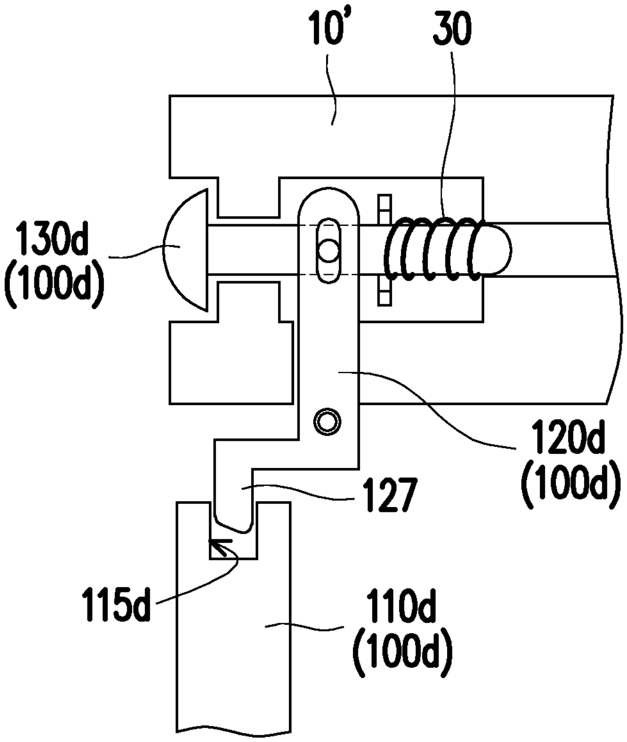
FIG. 4 is a schematic diagram of an electronic device being mechanically fixed to a vehicle body according to another embodiment of the disclosure.

FIG. 4 is a schematic diagram of an electronic device being mechanically fixed to a vehicle body according to another embodiment of the disclosure. Referring to FIGS. 3C and 4 at the same time, an electronic device 100*d* is similar to the electronic device 100*c* in FIG. 3C, and the difference between the two is that in the embodiment, the electronic device 100*d* regulates the storage state of a display 110*d* through a mechanical method. In detail, a modulation unit 120*d* of the embodiment may be, for example, a crank rod, the modulation unit 120*d* has a hook 127 and a control unit 130*d* may be, for example, a button.

When the user presses the control unit 130*d*, a stop spring 30 moves to drive the modulation unit 120*d* to move up and down, so that the hook 127 may withdraw from a slot 115*d* of the display 110*d*, and the display 110*d* may be taken out for use.

In short, through the electronic control and mechanism design, the electronic device 100*c* and the electronic device 100*d* may automatically extend the display 110*c* and the display 110*d* in front for the user's convenience of use, and may remember the previous position so that the display 110*c* and the display 110*d* may be directly moved to the previous angle and height position when being activated next time. In addition, the electronic control switch and mechanism design may also be used to allow the user to quickly take and place the display 110*c* and the display 110*d*.

Based on the above, in the embodiments of the disclosure, the display is connected to the vehicle body through the modulation unit, and the control unit controls the modulation unit to regulate the fixed state of the display. Through the design, the fixed state of the display may be quickly regulated, so that the display has more operational freedom, and the electronic device of the disclosure may have better flexibility of use.

Finally, it should be noted that the above embodiments are merely used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. An electronic device, disposed on a back of a vehicle seat, comprising:
- a display;
- a modulation unit, through which the display being connected to the vehicle seat; and
- a control unit, electrically connected to the modulation unit, wherein the control unit controls the modulation unit to adjust a fixed state of the display by moving the display between a retracted position adjacent to the vehicle seat and an extended position away from the vehicle seat toward a passenger, and
- wherein the modulation unit is configured to memorize a last position of the display for subsequent use,
- wherein the modulation unit comprises an electromagnetic structure, and the control unit is configured to regulate an amount of energy output by the electromagnetic structure, and control the modulation unit to automatically return and lock the display if the display is not taken out for a period of time after the electromagnetic structure is released.

2. The electronic device according to claim 1, wherein the modulation unit comprises at least one connecting rod, and one end of the at least one connecting rod is connected to the display, and the other end of the at least one connecting rod is connected to the vehicle seat.

3. The electronic device according to claim 2, wherein the at least one connecting rod comprises at least one single rod, at least one double connecting rod, at least one single-axis connecting rod or at least one multi-axis connecting rod.

4. The electronic device according to claim 1, further comprising:
- at least one buffer member, disposed on the vehicle seat, wherein the at least one buffer member is adjacent to the modulation unit, or the at least one buffer member is adjacent to the display.

5. The electronic device according to claim 4, wherein the at least one buffer member comprises at least one airbag.

6. The electronic device according to claim 1, further comprising:
- at least one sensing module, electrically connected to the control unit and configured to output at least one sensing signal, and the control unit controlling the modulation unit according to the at least one sensing signal.

7. The electronic device according to claim 6, wherein the at least one sensing module comprises at least one infrared ranging, at least one memory motor rotation number, at least one pressure sensing or at least one force sensing.

8. The electronic device according to claim 6, wherein the at least one sensing module and the modulation unit are disposed at the same position.

9. The electronic device according to claim 1, wherein the vehicle seat comprises at least one fixed structure, and the display is fixed to the vehicle seat through the at least one fixed structure.

10. The electronic device according to claim 9, wherein the at least one fixed structure comprises at least one latch that engages with a slot on the display and fixes the display to the vehicle seat.

11. The electronic device according to claim 1, wherein the vehicle seat comprises at least one groove, and the display is partially accommodated in the at least one groove.

12. The electronic device according to claim 1, further comprising:

a drive unit, electrically connected to the control unit and configured to send a drive signal to the control unit.

13. The electronic device according to claim 12, wherein the drive unit comprises a button.

14. The electronic device according to claim 1, further comprising:

a power supply, supplying power and electrically connected to the control unit, wherein the control unit comprises a control circuit and a drive circuit that are electrically connected to each other.

15. The electronic device according to claim 1, wherein the fixed state comprises a first fixed strength and a second fixed strength, and the first fixed strength and the second fixed strength are different.

16. The electronic device according to claim 1, wherein the fixed state comprises a first fixed position and a second fixed position, and the first fixed position and the second fixed position are different.

17. The electronic device according to claim 1, wherein the vehicle seat comprises a charging coil, which electrically connects the vehicle seat and the display.

18. The electronic device according to claim 1, wherein the modulation unit comprises a crank rod.

19. The electronic device according to claim 1, wherein the modulation unit has a hook, the display has a slot, and the hook withdraws from the slot for the display being taken out.

* * * * *